United States Patent
Hofmann et al.

(10) Patent No.: US 12,355,327 B2
(45) Date of Patent: Jul. 8, 2025

(54) ROTOR BEARING ASSEMBLY FOR FLUID FLOW POWER PLANTS

(71) Applicant: AKTIEBOLAGET SKF, Gothenburg (SE)

(72) Inventors: Matthias Hofmann, Schweinfurt (DE); Michael Baumann, Gädheim (DE)

(73) Assignee: AKTIEBOLAGET SKF, Gothenburg (SE)

(*) Notice: Subject to any disclaimer, the term of this patent is extended or adjusted under 35 U.S.C. 154(b) by 201 days.

(21) Appl. No.: 17/965,866

(22) Filed: Oct. 14, 2022

(65) Prior Publication Data

US 2023/0130950 A1 Apr. 27, 2023

(30) Foreign Application Priority Data

Oct. 25, 2021 (DE) .................... 102021211984.0

(51) Int. Cl.
*H02K 5/173* (2006.01)
*F16J 15/3232* (2016.01)
(Continued)

(52) U.S. Cl.
CPC ........ *H02K 5/1735* (2013.01); *F16J 15/3232* (2013.01); *H02K 7/085* (2013.01);
(Continued)

(58) Field of Classification Search
CPC .. F03B 11/06; F03B 13/26; F05B 2220/7068; F05B 2240/54; F05B 2240/572;
(Continued)

(56) References Cited

U.S. PATENT DOCUMENTS

| 11,635,104 B2 * | 4/2023 | De Laet | F03D 80/50 |
| | | | 29/525.11 |
| 2011/0018266 A1 * | 1/2011 | Oswald | F03B 3/128 |
| | | | 415/110 |

(Continued)

FOREIGN PATENT DOCUMENTS

| DE | 102014201465 A1 * | 7/2015 | ............. F03D 15/00 |
| EP | 3628858 A1 | 4/2020 | |
| WO | 2008031426 A2 | 3/2008 | |

OTHER PUBLICATIONS

DE-102014201465-A1, Smook, all pages (Year: 2015).*

(Continued)

*Primary Examiner* — Naishadh N Desai
(74) *Attorney, Agent, or Firm* — J-TEK LAW PLLC; Scott T. Wakeman; Mark A. Ussai

(57) ABSTRACT

A rotor bearing assembly for an underwater generator of a fluid flow power plant includes a hollow cylindrical bearing carrier configured to be inserted into an interior of a rotor and releasably connected to the rotor such that they rotate together and an axle journal extending into an interior of the bearing carrier and rotatably supporting the bearing carrier. The bearing the axle journal and the bearing carrier are configured as an installation unit such that a portion of the bearing carrier is insertable into the rotor interior and removable from the rotor interior while attached to the axle journal. Also a generator including the rotor bearing assembly.

18 Claims, 2 Drawing Sheets

(51) Int. Cl.
    *H02K 7/08*      (2006.01)
    *H02K 7/12*      (2006.01)
    *H02K 21/14*     (2006.01)
    *F03B 13/26*     (2006.01)

(52) U.S. Cl.
    CPC ............. *H02K 7/12* (2013.01); *H02K 21/14* (2013.01); *F03B 13/26* (2013.01); *F16C 2380/26* (2013.01)

(58) Field of Classification Search
    CPC .. F16C 2380/26; F16J 15/3232; H02K 21/14; H02K 5/1735; H02K 5/1737; H02K 7/085; H02K 7/12; H02K 7/1823; Y02E 10/30
    See application file for complete search history.

(56) References Cited

U.S. PATENT DOCUMENTS

2020/0018569 A1\* 1/2020 Hofmann ................. F41G 1/38
2022/0178402 A1\* 6/2022 Baumann ............. F16C 35/042

OTHER PUBLICATIONS

Extended European Search Report from the European Patent Office dispatched Apr. 5, 2023, in related application No. EP 22 201 227.0, including European Search Opinion.

\* cited by examiner

ROTOR BEARING ASSEMBLY FOR FLUID FLOW POWER PLANTS

CROSS-REFERENCE

This application claims priority to German patent application no. 10 2021 211 984.0 filed on Oct. 25, 2022, the contents of which are fully incorporated herein by reference.

TECHNOLOGICAL FIELD

The present invention relates to a rotor bearing assembly for a generator, in particular an underwater generator, of a fluid flow power plant, as well as to a generator, in particular an underwater generator, having such a rotor bearing assembly.

BACKGROUND

Generators are used in fluid flow power plants, such as, for example, tidal power plants and wind turbines. In the case of tidal power plants or water power plants the generators are completely immersed in flowing water and are often cooled by the surrounding water. Here in particular generators are used in which the stator is carried by a housing and the rotor must be supported on a stationary axle journal connected to the housing such that the axle journal and the housing are rotationally fixed. In order to protect this bearing from the surrounding water and/or from contaminants, the bearing is sealed using special seals, such as, for example, a seawater seal that interacts with the axle journal.

However, it is problematic in such assemblies that, for example, during maintenance of the bearing an expensive removal of the components, in particular the seal assembly, is necessary, during which water can also penetrate into the sensitive bearing interior, which can lead to increased corrosion.

SUMMARY

It is therefore an aspect of the present disclosure to provide a rotor bearing assembly that is simple and quick to install and remove and which in the case of underwater generators the bearing interior is reliably protected from the entry of water.

In the following a rotor bearing assembly is disclosed for a generator, in particular an underwater generator of a fluid flow power plant, in particular of a tidal power plant; the rotor bearing assembly includes a stationary axle journal that is configured to spatially arrange a rotor in a stator and to hold the rotor at a predetermined spacing with respect to the stator. Furthermore, the rotor bearing arrangement comprises a bearing assembly that is configured to support the rotor rotatably on and around the axle journal. The bearing arrangement has a bearing carrier which can be connected in a rotationally fixed manner to the rotor and that has a hollow-cylindrical bearing support section. This bearing carrier section defines a bearing carrier interior into which the axle journal extends.

In order to make possible a simplest possible installation or removal of the rotor bearing assembly into/from the generator, the hollow-cylindrical bearing carrier section is dimensioned such that it is introducible in a rotor interior defined by the rotor and releasably connected to the rotor so that the axle journal and the bearing assembly are configured as an installation unit that is introducible into the rotor interior and removable from the rotor interior in its entirety.

Since the rotor bearing assembly can be removed from the generator as a complete unit, it is possible to leave the housing or the generator in its position, in particular in its underwater position, and to remove only the rotor bearing assembly and to transport it for maintenance on land or on a ship or other dry location.

According to one advantageous exemplary embodiment, the bearing assembly includes at least one bearing unit that comprises at least one inner ring and one outer ring and which is disposed between the axle journal and the bearing carrier. Here the axle journal is disposed such that the at least one inner ring is connected to the axle journal in a rotationally fixed manner and such that the at least one outer ring is connected to the bearing carrier such that the outer ring and the bearing carrier rotate together. The bearing carrier, the at least one bearing unit, and the axle journal are thus formed as a common unit that is installable and removable. During the installation or removal of the rotor bearing assembly, the bearing units themselves therefore neither need to be removed from the bearing carrier nor from the axle journal in order to remove the entire assembly from the generator or introduce the entire assembly into the generator.

The bearing units themselves can be rolling-element bearings or plain bearings. Here it is preferred in particular that the bearing units are configured as rolling-element bearings, in particular tapered roller bearings, that are designed to support high loads and to withstand tilting moments.

In particular, one embodiment is preferred in which two bearing units are provided that are spaced from each other on the axle journal. According to a further preferred exemplary embodiment, the two spaced bearing units are disposed with respect to the rotor such that both are disposed radially inside and axially overlapping in the rotor interior, in particular inside a rotor carrier. Here they are preferably equally spaced axially in the center of the rotor, and in particular centrally with respect to a rotor central axis. The bearing units are preferably tapered roller bearings in an O-arrangement. This makes possible a particularly stable, tilt-proof, and positionally precise support of the rotor with respect to the stator.

In addition to the design that the bearing units include an inner or outer ring, it is also of course possible that the bearing carrier and/or the axle journal itself are configured as an inner or outer ring. Here the bearing carrier and/or the axle journal can in particular include raceways on which rolling elements roll.

However, since the bearings are wear parts, it is preferable to design the bearing carrier and axle journal as separate elements and to attach the bearing units or the corresponding inner/outer ring to the bearing carrier or axle journal.

According to a further advantageous exemplary embodiment, the axle journal furthermore includes a radially extending flange that is configured to be connectable to a stationary housing that surrounds the generator. This makes it possible to close the generator interior with respect to an external environment. Here, however, the surrounding fluid, in particular the water, can still penetrate into the generator space via the connection between flange and housing in order to act as coolant for the generator.

It is preferred in particular that the flange and/or the housing includes at least one, preferably a plurality of, circumferentially distributed through-opening(s). These through-openings provide an access, in particular an installation access, to a generator interior. Thus, for example, a tool can be guided through the through-openings to an attachment means by which the bearing assembly is attached to the rotor in order to release the connection between the bearing carrier and the rotor. In this way work can also be performed in the generator interior without disassembling the entire generator.

According to a further advantageous exemplary embodiment, the bearing carrier includes at least one radially extending flange section that includes a plurality of circumferentially distributed, axially extending attachment-means receptacles so that the bearing carrier is attachable to the rotor using an axially extending attachment means. The bearing carrier flange thus makes possible an attaching of the bearing carrier to an end side of the rotor, which end side is axially accessible, so that the accessibility is not impeded or restricted by the radially outwardly disposed stator.

With such an axial accessibility it is also particularly preferred that that the through-openings provided in the flange and/or in the housing also extend axially and are preferably oriented toward the plurality of circumferentially distributed attachment-means receptacles of the bearing carrier. Then the axially extending or oriented attachment means are accessible via correspondingly oriented through-openings in the housing or the flange of the axle journal so that for a removal of the rotor bearing assembly, only the attaching between axle journal flange and the housing and between the rotor and the bearing carrier need be released in order to remove the entire rotor bearing assembly from the generator interior or to attach it in the generator interior in an analogous manner.

The through-openings configured in this manner can preferably be coverable by a cover that can be waterproof. Alternatively the cover element can also not completely seal against a water entry, in particular when the generator is cooled with the aid of the surrounding water. In this case the cover only prevents contaminants from entering into the generator interior, but water is not completely prevented from entering.

According to a further preferred exemplary embodiment, in the case of underwater generators the rotor bearing assembly furthermore includes at least one seal assembly that is configured to seal the bearing carrier interior against the penetration of water. Even when in the case of underwater generators water is preferred as coolant in the generator interior, an entry of water into the bearing unit or into the bearing carrier interior itself is to be avoided since this can damage the bearing units and lead to a reduced service life. The reason for this is the increased corrosion of a bearing unit that is exposed to water. Here the seal assembly is preferably disposed on at least one axial side of the bearing assembly, preferably on the side equipped with the flange. On this side the axle journal enters into the bearing carrier interior and thus exposes the bearing carrier interior to an external environment so that a water entry is possible here.

However, since water can also diffuse into the bearing interior via the connection between the bearing carrier and the rotor, it is furthermore advantageous to provide a radially extending cover element that is attached to the hollow-cylindrical bearing carrier section and that sealingly closes off the bearing carrier interior; preferably the cover element is disposed on the side facing away from the seal assembly. It can thereby be ensured that water that diffuses into the rotor interior between the bearing carrier and the rotor cannot penetrate into the bearing carrier interior.

Of course, it is also possible to form the cover element one-piece with the bearing carrier. The bearing carrier then has a pot shape in which the radially extending cover element forms the pot base. A particularly secure sealing of the bearing assembly can thereby be achieved.

With the aid of the seal assembly and the cover element, the bearing assembly is formed as a so-called cassette bearing assembly in which the bearing units are disposed in a completely closed-off bearing carrier interior. The bearing carrier interior is thus completely sealed off from an environment radially by the bearing carrier and the axle journal and axially by the cover element and the seal. The entire unit can thus be removed from the generator interior or introduced into the bearing interior without water penetrating into the sensitive bearing carrier interior.

According to a further preferred exemplary embodiment, the seal assembly can be a seal lip carrier that carries a plurality of seal lips and can include an optional slip sleeve against which the plurality of seal lips slip. The slip sleeve can also be formed, for example, over the axle journal. Such a seal assembly has proved to be particularly resistant to water penetration since the plurality of seal lips can reliably prevent water from entering into the sensitive bearing interior. In addition, the seal lip elements and the slip sleeve can be easily exchanged in the event of wear.

Such a seal assembly can include rotating seal lips that are attached to a rotating seal carrier and that slip against a stationary slip sleeve, or stationary seal lips that are attached to a stationary seal carrier and slip against a slip sleeve. Here, as a particularly preferred exemplary embodiment shows, the seal lip carrier can be attached to the axle journal and the slip sleeve can be attached to the bearing carrier, or the seal lip carrier is attached to the bearing carrier and the slip sleeve is attached to the axle journal. As mentioned above, the slip sleeve and/or the seal lip carrier can also be formed one-piece with axle journal and/or bearing carrier.

Of course, other seal assemblies are also possible in which a combination of rotating and stationary seal lips can also be used. It is important for the seal assembly only that it can prevent as completely as possible an entry of water into the sensitive bearing interior.

A further aspect of the present disclosure relates to a generator, in particular an underwater generator, for a fluid flow power plant that includes a stator and an inner rotor that are disposed in a housing, wherein the stator is connected to the housing such that they are rotationally fixed, and the rotor includes a rotor carrier that is configured to radially outwardly carry the rotor blade package, and to radially inwardly define a cylindrical rotor interior. According to the invention, the rotor is positionable relative to the stator using an above-described rotor bearing assembly. Such a generator makes possible a stable and positionally precise arrangement of the rotor in the stator and simultaneously a simple maintenance of the rotor bearing assembly in the event that the seal and/or bearing units must be renewed. Such a generator can also essentially remain in its position in a nacelle on a wind turbine tower or under water even when maintenance work must be carried out on the rotor bearing assembly.

If the rotor bearing assembly is removed from the generator, it is furthermore advantageous when the generator housing includes a radially inwardly extending housing section that in the operating state is connected to a flange of an axle journal of the rotor bearing assembly and furthermore includes at least one locking device that is configured to interact with a locking device on the rotor so that in the installed state the rotor is lockable in the stator in its prescribed position. Using this locking device it can be ensured that even during removal of the rotor bearing assembly the rotor does not collide with the stator in an uncontrolled manner due to magnetic forces therebetween, which would cause the entire generator to have to be disassembled and assembled again.

The locking device can be realized, for example, by a simple screw fastening in which a screw is screwable into a screw receptacle provided on the rotor with the screw being able to extend through a through-opening in the housing section of the generator. Of course, a plurality of locking devices can also be present, or the locking device can include, for example, a plurality of screw connections.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
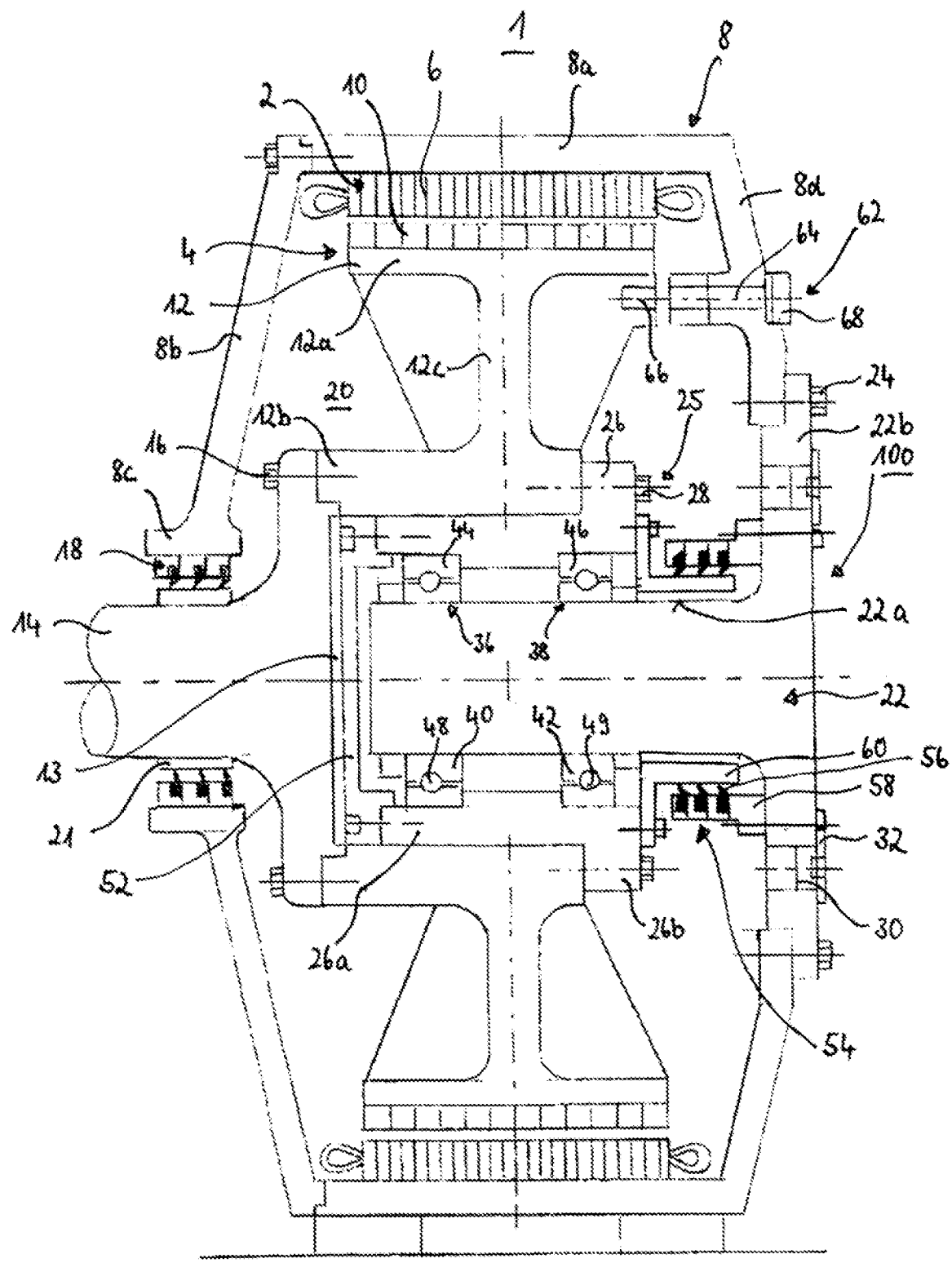
FIG. 1 is a schematic sectional view of a generator, configured as an underwater generator, for a fluid flow power plant according to a first preferred exemplary embodiment.
Figure 2:
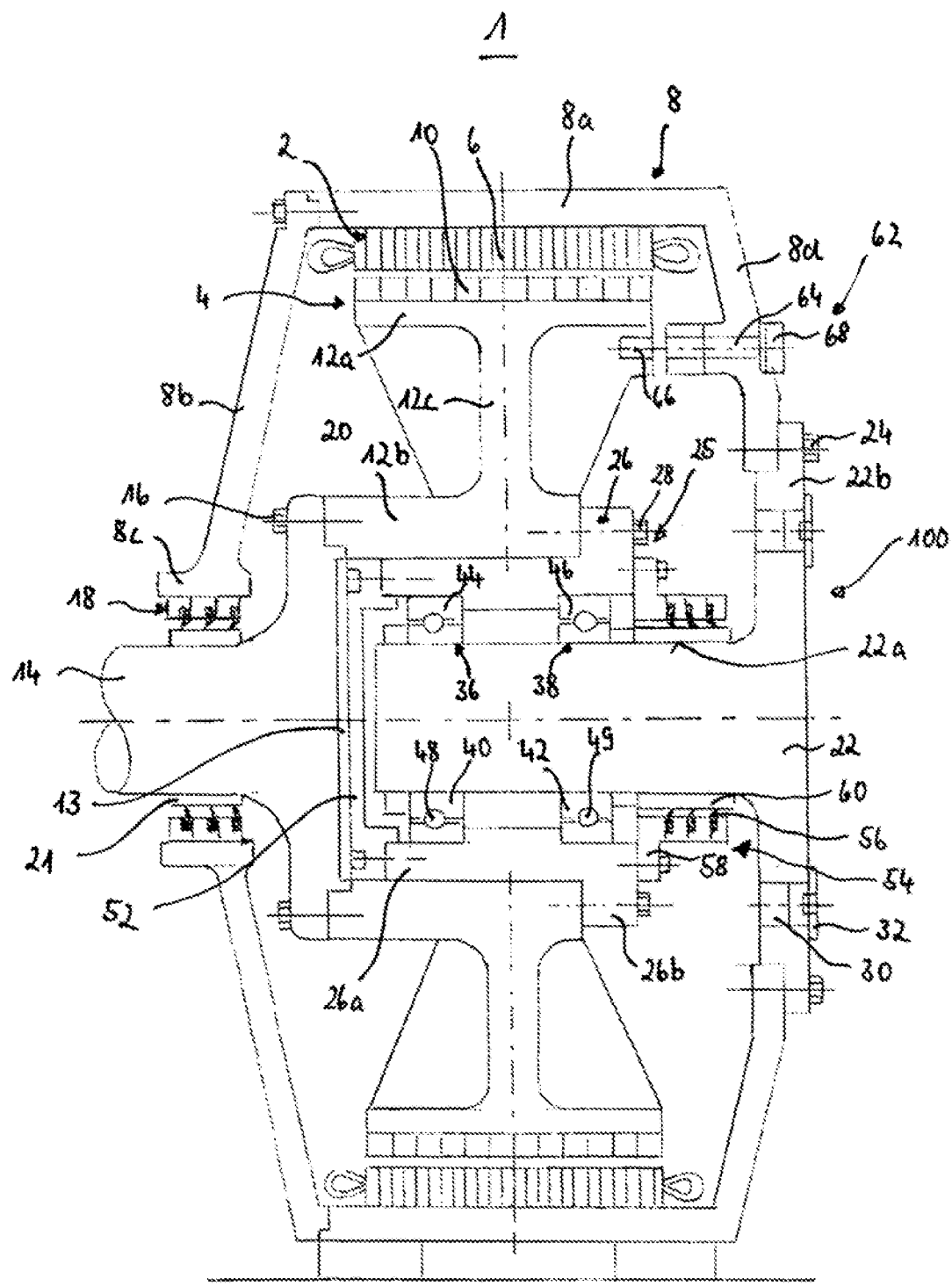
FIG. 2 is a schematic sectional view of a generator, configured as an underwater generator, for a fluid flow power plant according to a second preferred exemplary embodiment.

FIGS. 1 and 2 schematically show a sectional view through a generator, in particular through an underwater generator 1, that includes a stator 2 and a rotor 4. The stator 2 includes core assemblies 6 and is carried by a housing 8. The housing 8 is stationary and, as depicted in FIGS. 1 and 2, can be assembled from a plurality of parts 8a, 8b.

The rotor 4 is configured as an inner rotor and is disposed radially inside the stator 2. It includes permanent magnets 10 that are carried by a rotor carrier 12, the permanent magnets in particular being screwed or adhered onto the rotor carrier 12. The permanent magnets are preferably manufactured from neodymium and have a particularly high magnetic force. Instead of the preferred permanent magnets, however, the rotor can also include blade assemblies that are carried by the rotor carrier 12. In the depicted exemplary embodiments, the rotor carrier 12 has a radially outer axially extending section 12a and a radially inner axially extending section 12b that are connected to a radially extending disk-shaped element 12c. Here the magnets or rotor blade assemblies 10 are carried by the radially outer axially extending rotor carrier section 12a. The radially inner axially extending rotor carrier section 12b defines within itself a rotor interior 13 and is furthermore configured such that it is connected to a rotor input shaft 14 via, for example, attachment means 16 (e.g., bolts), such that the rotor carrier section 12b and the rotor input shaft 14 rotate together so that the entire rotor 4 can be set into rotation. The rotor input shaft 14 is connected, for example, to rotor blades (not shown) driven by a current (e.g., flowing water) such that the rotor input shaft 14 and the rotor blades rotate together. In the case of other fluid flow power plants, such as, for example, a wind turbine, the rotor input shaft 14 can also be connected to a transmission.

As can furthermore be seen from FIGS. 1 and 2, the housing section 8b extends radially inward toward the rotor input shaft 14 and carries on its radial inner end 8c a seal assembly 18 that interacts with the rotor input shaft 14 in order to prevent contaminants from the external environment from penetrating into a generator interior that is defined by the housing 8. In the exemplary embodiments depicted in the Figures, the seal assembly 18 is formed from a plurality of seal lips that slip against a slip sleeve 21 on the rotating rotor input shaft 14. Of course, it is would also be possible to attach the seal lips to the rotor input shaft 14 and to allow them to slip against the housing section 8c.

The rotor 4 itself is secured in its position with respect to the stator 2 by a rotor bearing assembly 100. Here the rotor bearing assembly 100 comprises an axle journal 22 that is stationary relative to the housing 8 and that includes a cylindrically extending section 22a and a radially extending flange section 22b. The radially extending flange section 22b of the stationary axle journal 22 is in turn connected to the housing 8 by attachment elements 24 so that the generator space 20 is closed off. In the depicted exemplary embodiments, the housing 8 includes a further, radially inwardly extending housing section 8d that interacts on its radially inner end with the flange section 22b of the axle journal 22.

The rotor bearing assembly 100 furthermore includes a bearing assembly 25 with a bearing carrier 26 that is dimensioned such that it is introducible into the rotor interior 13. Here the bearing carrier 26 comprises a hollow-cylindrical bearing carrier section 26a and an axially extending flange section 26b. Here the cylindrical outer surface of the bearing carrier section 26a contacts the cylindrical inner surface of the rotor carrier section 12b. Furthermore, the axially extending flange section 26b of the bearing carrier extends along an end side of the rotor carrier 12 and is attached to the rotor carrier 12 by attachment means 28 so that the bearing carrier 26 is configured to rotate with the rotor carrier 12. Here it is preferred in particular that the attachment means 28 extend axially so that they are accessible from axially outside the housing 8 in order to release the connection between the bearing carrier 26 and the rotor carrier 12b.

In order to ensure such an accessibility to the attachment means 28, the axle journal flange 22b furthermore includes through-openings 30, through which a tool is introducible into the generator interior in order to release or fasten the attachment means 28. Depending on the design, such a through-opening can also be formed in the radially extending housing section 8d. If instead of an axial accessibility of the attachment means, a radial accessibility is desired, the through-opening(s) is/are preferably disposed in the axially extending housing section 8a.

In operation, the through-openings 30 can be closed by cover elements 32.

Furthermore, in the depicted exemplary embodiment, two bearing units 34, 36 are provided between the bearing carrier 26 and the axle journal 22 that rotatably support the rotating components, comprised of the rotor 4 and the bearing carrier 26, with respect to the stationary axle journal 22. The bearing units 36, 38 can be, as depicted, rolling-element bearings, but it is also possible that the bearing units are plain bearings.

As depicted in the Figures, the two spaced bearing units 36, 38 are preferably disposed with respect to the rotor 4 such that both are disposed radially inside and axially overlapping with the rotor carrier 12a, and each is disposed to the left and right of the axial center of the rotor carrier 12a, for example, to the left and right of the disk-shaped connecting element 12c. The bearing units 36, 38 are preferably tapered roller bearings in an O-arrangement.

In the depicted exemplary embodiment, each bearing unit 36, 38 comprises an inner ring 40, 42 that is connected to the axle journal 22 such that they rotate together and outer rings 44, 46 that are connected to the bearing carrier 26 such that the outer rings 44, 46 and the bearing carrier 26 rotate together. In the depicted exemplary embodiment, rolling elements 48, 49 are present between the inner rings and outer rings that roll on the inner rings 40, 42 or the outer rings 44, 46. Since the bearing carrier 26 (via the attachment means 28) and the axle journal 22 (via the attachment means 24) are completely releasable from the rotor 4 and the housing 8, the rotor bearing assembly 100 can be removed in its entirety from the generator interior 20.

As mentioned above, in the case of underwater generators the generator interior 20 can be flooded with water that functions as coolant for the generator. However, since this water is harmful to the bearings 36, 38 and can also enter into the generator space 20 during removal or installation, or during maintenance and/or during any release of the attachment means 24 or 28 and damage the bearings 36, 38, it is furthermore provided that a bearing carrier interior 50, which is formed by the hollow-cylindrical section 26a of the bearing carrier, is completely closed off from an external environment, in particular the generator interior 20. For this purpose the bearing carrier 26 includes on its end facing the rotor input shaft 14 a cover element 52 that is sealingly attached to the bearing carrier 26. Alternatively the cover element 52 can be formed one-piece with the bearing carrier 26.

In contrast, on the side facing away from the rotor input shaft 14, a seal device 54 is provided that interacts with the axle journal 22 or the bearing carrier 26 such that also here the bearing interior 50 is completely sealed off from the external environment.

A cassette-shaped rotor bearing assembly arrangement 100 is thereby provided that can also be removed under water from the generator 1 or inserted therein without the risk of subjecting the sensitive bearing interior 50 to a high corrosion risk due to water entry.

As depicted in FIGS. 1 and 2, the seal assembly 54 itself comprises a plurality of seal lip 56 that are attached to a seal lip carrier 58 and that slip against a slip sleeve 60. Here, as depicted in FIG. 1, the seal lip carrier 58 can be connected to the axle journal 22, in particular to the flange region 22b of the axle journal 22, such that the seal lip carrier 58 and the axle journal 22 rotate together; however, it is also possible to design the seal lip carrier 58 such that it rotates together with the bearing carrier 26, as depicted in FIG. 2.

In the exemplary embodiment depicted in FIG. 1, a stationary seal lip assembly 56 is thus presented that slips against a rotating slip sleeve 60, the slip sleeve 60 in this case being connected to the bearing carrier 26 such that they rotate together, while in the case depicted in FIG. 2, a rotating seal lip assembly 56 is presented that slips against a stationary slip sleeve 60, which in this case is connected to the axle journal 22 such that they are rotationally fixed.

Of course, other designs of the seal assembly are also possible, but it should be ensured that no water can penetrate into the sensitive bearing interior 50 via the seal assembly 54. Since both the seal lip carrier 58 and the slip sleeve 60 are attached in their entirety to the axle journal 22 or to the bearing carrier 26, the entire seal assembly 54 is also part of the rotor bearing assembly arrangement 100 and can be removed together with the bearing assembly and the axle journal from the generator interior 20. A completely sealed rotor bearing assembly arrangement 100 can thereby be provided that is installable in the generator or removable from the generator in its entirety.

In order to make possible such a removal, it is furthermore provided that the positioning between the stator 2 and the rotor 4 can be fixed by a locking device 62 even when the rotor bearing assembly arrangement 100 is removed from the generator. In the exemplary embodiment depicted in FIGS. 1 and 2, the locking device 62 is formed by an axially extending through-opening 64 in the stationary housing 8d. This through-opening 64 is aligned with a corresponding receptacle 66 in the rotor carrier 12. If a locking is to be effected, a locking element, for example, a screw element 68, can be introduced through the opening 64 such that it extends into the receptacle 66 to thus secure the rotor 4 in its position with respect to the stator 2 or generally in its position in the generator interior 20. With attachment means 68 introduced into the locking device 62, a radial, axial, or circumferential displacement of the rotor 4 is no longer possible. This in turn allows the entire rotor bearing assembly 100 to be removed from the generator interior without displacing the rotor, which could damage the generator. In particular, the strong permanent magnets, for example, made of neodymium, carried by the rotor develop an enormous attractive force, so that a removal of the rotor 4 is normally only possible with extreme effort. If namely the magnets 10 contact the stator 2 here, then due to the attractive force a separation is almost impossible.

Overall, with the presented rotor bearing assembly a simple to install and remove unit is provided that is easily installable in a generator, in particular an underwater generator, and removable without special precautions having to be taken with respect to the water tightness in order to protect the water-sensitive bearing units. Thus, for example, it is also possible to exchange the rotor bearing assembly directly at the installation position, such as, for example, the underwater position of the generator, or in general remove the rotor bearing assembly without an expensive drying process. Due to the enclosed nature of the rotor bearing assembly, it can be ensured that the entire bearing unit is protected from a harmful corrosive influence of water.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rotor bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Generator
100 Rotor bearing assembly
2 Stator
4 Rotor
6 Stator core assembly
8 Housing
10 Permanent magnets
12 Rotor carrier
13 Rotor interior
14 Rotor input shaft
16 Attachment means
18 Seal assembly
2 Generator interior
22 Axle journal
24 Attachment means
25 Bearing assembly
26 Bearing carrier
28 Attachment means
30 Through-opening
32 Cover element
36, 38 Bearing unit
40, 42 Inner ring
44, 48 Outer ring
48, 49 Rolling element
50 Bearing interior
52 Cover element
54 Seal assembly
56 Seal lip assembly
58 Seal lip carrier
60 Slip sleeve
62 Locking device
64 Through-opening
66 Receiving opening
68 Locking element

What is claimed is:

1. A rotor bearing assembly for an underwater generator of a fluid flow power plant, the bearing assembly comprising:
   a hollow cylindrical bearing carrier configured to be inserted into an interior of a rotor and releasably connected to the rotor such that they rotate together, and
   an axle journal extending into an interior of the bearing carrier and rotatably supporting the bearing carrier,
   wherein the axle journal and the bearing carrier are configured as a watertight installation unit configured to be at least partially inserted into the rotor interior and removable from the rotor interior while attached to the axle journal.

2. The rotor bearing assembly according to claim 1, wherein the bearing carrier is rotatably supported on the axle journal by a rolling-element bearing.

3. The rotor bearing assembly according to claim 2, wherein the rolling-element bearing includes an inner ring attached to the axle journal to rotate with the axle journal and an outer ring attached to the bearing carrier to rotate with the bearing carrier.

4. The rotor bearing assembly according to claim 3, wherein the bearing carrier includes a radially extending first flange having a plurality of first through openings by which the bearing carrier is connectable to the rotor.

5. A rotor bearing assembly for an underwater generator of a fluid flow power plant, the bearing assembly comprising:
   a hollow cylindrical bearing carrier configured to be inserted into an interior of a rotor and releasably connected to the rotor such that they rotate together, and
   an axle journal extending into an interior of the bearing carrier and rotatably supporting the bearing carrier,
   wherein the bearing the axle journal and the bearing carrier are configured as an installation unit such that a portion of the bearing carrier is insertable into the rotor interior and removable from the rotor interior while attached to the axle journal,
   wherein the bearing carrier is rotatably supported on the axle journal by a rolling-element bearing,
   wherein the rolling-element bearing includes an inner ring attached to the axle journal to rotate with the axle journal and an outer ring attached to the bearing carrier to rotate with the bearing carrier,
   wherein the bearing carrier includes a radially extending first flange having a plurality of first through openings by which the bearing carrier is connectable to the rotor,
   wherein the axle journal includes a radially extending second flange configured to be connected to a stationary generator housing, and
   wherein the second flange includes a plurality of second through-openings.

6. The rotor bearing assembly according to claim 5, wherein the second flange includes at least one third through-opening alignable with each of the first through openings by rotating the bearing carrier relative to the axle journal.

7. The rotor bearing assembly according to claim 1, wherein a first end of the bearing carrier is closed by an axial end wall,
   wherein a second end of the bearing carrier is open, and
   wherein a seal assembly at the second end of the bearing carrier forms a seal between the bearing carrier and the axle journal to seal the interior of the bearing carrier.

8. The rotor bearing assembly according to claim 7, wherein the axial end wall includes a removable cover element.

9. The rotor bearing assembly according to claim 7, wherein the seal assembly includes a slip sleeve and a seal lip carrier supporting a plurality of seal lips in contact with the slip sleeve.

10. The rotor bearing assembly according to claim 9, wherein the seal lip carrier is attached to the axle journal and the slip sleeve is attached to the bearing carrier, or wherein the seal lip carrier is attached to the bearing carrier and the slip sleeve is attached to the axle journal.

11. A generator for a fluid power plant comprising:
    a housing;
    a stator mounted in the housing in a rotationally fixed manner;
    a rotor having a central opening, and
    a rotor bearing assembly according to claim 2 connected to the housing such that the bearing carrier extends into rotor central opening and supports the rotor for rotation relative to the stator.

12. The generator according to claim 11,
wherein the housing includes a first locking opening,
wherein the rotor includes a second locking opening axially alignable with the first locking opening such that a fastener extending through the first locking opening into the second locking opening prevents rotation of the rotor relative to the stator.

13. The rotor bearing assembly according to claim 1,
including a rolling-element bearing between the bearing carrier and the axle journal configured to support the bearing carrier for rotation relative to the axle journal, and
a seal element located outside the interior of the bearing carrier and configured to form a seal between the bearing carrier and the axle journal,
wherein the bearing carrier has a closed first end and an open second end and a radially outwardly projecting first flange at the second end and a plurality of first through openings in the first flange via which the first flange is connectable to the rotor, and
wherein a first end of the axle journal extends into the interior of the bearing carrier and a second end of the axle journal is located outside the bearing carrier and includes a radially outwardly projecting second flange having a plurality of second through openings via which the second flange is connectable to a housing of the generator and at least one third through opening alignable with each of the plurality of first through openings by rotating the bearing carrier relative to the axle journal.

14. A generator comprising:
a housing having an interior and a first opening opposite a second opening and a plurality of first bores surrounding the second opening,
a stator mounted in the interior of the housing,
a rotor inside the stator, the rotor having a shaft extending from a first end of the rotor through the first opening of the housing and a second end having an opening into a hollow interior of the rotor and a plurality of second bores surrounding the opening of the rotor, and
a rotor bearing assembly according to claim 13,
wherein the bearing carrier extends into the hollow interior of the rotor through the opening in the second end of the rotor,
wherein the plurality of first through-openings in the first flange are aligned with the plurality of second bores in the rotor,
wherein a plurality of first fastener extend through the plurality of first through-openings into the second bores to connect the bearing carrier to the rotor,
wherein the second flange is mounted against the housing with the plurality of second through-openings aligned with the plurality of first bores, and
wherein a plurality of second fasteners extend through the plurality of second through-openings and into the second bores to connect the axle journal to the housing.

15. The generator according to claim 14,
wherein the bearing carrier is dimensioned so as to be insertable into the housing through the second opening of the housing.

16. The generator according to claim 14,
wherein the second flange includes at least one third through-opening alignable with each of the first through-openings in the first flange of the bearing carrier by rotating the bearing carrier relative to the axle journal.

17. The generator according to claim 16,
wherein the housing includes a first locking opening and the rotor includes a second locking opening alignable with the first locking opening by rotating the rotor, and
wherein the rotor is lockable relative to the housing by inserting a locking bolt through the first locking opening into the second locking opening.

18. The rotor bearing assembly according to claim 1,
including a rolling-element bearing between the bearing carrier and the axle journal configured to support the bearing carrier for rotation relative to the axle journal, and
a seal element located outside the interior of the bearing carrier and configured to form a seal between the bearing carrier and the axle journal,
wherein the bearing carrier has a closed first end and an open second end, and
wherein a first end of the axle journal extends into the interior of the bearing carrier and a second end of the axle journal is located outside the bearing carrier and includes a radially outwardly projecting flange connectable to a housing of the generator.

* * * * *